United States Patent Office 3,436,434
Patented Apr. 1, 1969

3,436,434
DEALKYLATION OF ALKYL AROMATIC HYDROCARBONS
George R. Lester, Park Ridge, Ill., assignor to Universal Oil Products Company, Des Plaines, Ill., a corporation of Delaware
No Drawing. Filed Apr. 21, 1967, Ser. No. 632,528
Int. Cl. C07c *15/00, 15/04;* B01j *11/06*
U.S. Cl. 260—672        8 Claims

ABSTRACT OF THE DISCLOSURE

A process for dealkylating alkyl aromatic hydrocarbons, particularly alkylbenzenes, utilizing a rhodium-alkali metal-chromia-alumina catalyst composite.

BACKGROUND OF THE INVENTION

This invention relates to a process for dealkylating alkyl aromatic hydrocarbons, particularly alkylbenzenes. The improved petroleum refining techniques of recent years, particularly with respect to catalytic reforming, have resulted in a substantial output of alkyl aromatic hydrocarbons, especially the alkylbenzenes such as toluene, xylene, mesitylene, ethylbenzene, cumene, and the like. While the alkylbenzenes are generally desirable to impart improved antiknock characteristics to the gasoline fraction, benzene would in many instances be a more desirable and valuable product because of its fundamental and well-known utility as a building block in the field of organic chemistry. For example, benzene is in increasing demand as a starting material in the manufacture of styrene, phenol, nylon intermediates and the biodegradable alkylbenzene sulfonate detergents. An economical method for converting alkylbenzenes into benzene would therefore be highly desirable. This is particularly true in the case of toluene which is frequently produced in much larger quantities than can be economically utilized and which is also the most difficult to dealkylate.

It is an object of this invention to present a novel process for the dealkylation of alkyl aromatic hydrocarbons, particularly alkylbenzenes. It is a further object to disclose a novel catalytic composite which is highly active with respect to the dealkylation reaction herein contemplated and possesses a high degree of selectivity and stability.

SUMMARY OF THE INVENTION

One embodiment of this invention relates to a process for the dealkylation of an alkyl aromatic hydrocarbon which comprises commingling water with said hydrocarbon in a molar ratio of from about 2/1 to about 30/1 and heating the mixture at a temperature of from about 400° to about 600° C. in contact with a catalyst composition comprising alumina having from about 0.1 to about 4 weight percent alkali metal, from about 0.05 to about 2.5 weight percent rhodium and from about 1.0 to about 60 weight percent chromia composited therewith.

The alumina component of the described catalyst composite is a high surface area alumina characterized by a surface area of at least about 50 square meters per gram, and preferably a surface of from about 100 to about 300 square meters per gram. The alumina is suitably prepared by conventional methods described in the art. For example, an alkaline reagent, usually ammonium hydroxide, is added to an aqueous solution of an aluminum salt such as aluminum chloride whereby aluminum hydroxide is precipitated from the solution. Upon washing, drying and calcining at a proper temperature, say from about 540 to about 700° C., the aluminum hydroxide is converted to the desired alumina.

It has been found advantageous to steam treat the alumina component of the catalyst, preferably prior to the addition of the rhodium component thereto. The steam, usually diluted with air or nitrogen, is maintained in contact with the alumina for a period of from 1 to 24 hours at a temperature of from about 550 to about 750° C. The steam treatment tends to improve both the activity and stability of the finished catalyst.

The other components of the catalyst can be added to the alumina in any desired order. The chromia component may be subsequently impregnated on the alumina as hereinafter described, or the chromia may be co-precipitated with the alumina to form a homogeneous composite therewith. For example, an alkaline reagent such as ammonium hydroxide is added to a common solution of aluminum chloride and chromium nitrate whereby a coprecipitate is formed which, upon washing, drying and calcining, yields a chromia-alumina composite.

The alumina, or chromia-alumina, thus prepared may be formed into particles of uniform size and shape, for example, by commingling a pelleting agent such as hydrogenated vegetable oil, polyvinylamine graphite, etc., with the alumina or chromia-alumina in a powdered form and compressing the mixture into pellets.

A preferred method of preparing the alumina relates to the preparation of alumina spheres and comprises digesting aluminum in aqueous aluminum chloride and/or hydrochloric acid. It is then possible to manufacture the alumina spheres by dispersing the resultant sol in the form of droplets into an oil bath maintained at an elevated temperature effecting a gelatin of the droplets. The resultant spherical particles are retained in the oil bath until they set into firm gel spheres. The spheres are thereafter recovered and subjected to specific aging procedures under alkaline conditions to impart desired pore volume characteristics thereto. The method is substantially as described in U.S. Patent 2,620,314 issued to James Hoekstra. Again, the chromia component may be formed composited with the alumina in a spherical shape by substantially the same method. Thus, the aluminum may be digested in aqueous chromium chloride, instead of aluminum chloride, in the presence or absence of hydrochloric acid. The resulting sol may then be further treated in substantially the same manner and at the same conditions as last described to give a spherical composite of chromia and alumina in any desired proportions.

Generally, the chromia is impregnated on the alumina, for example, by suspending, dipping, or otherwise immersing the alumina in an aqueous solution of a suitable chromium compound, such as chromium nitrate or chromic acid, which is decomposable to chromia upon subsequent calcination. The alumina is immersed in the impregnating solution for a suitable period of time during which the excess water is evaporated therefrom, or after which the excess solution is decanted therefrom. The foregoing procedure may be repeated one or more times with or without intermediate drying to achieve the desired catalyst composition. In any case, the concentration of the impregnating solution should be such as to insure a final catalyst composite containing from about 1.0 to about 60 weight percent chromia, and preferably from about 5 to about 40 weight percent.

The alkali metal component is suitably added to the catalyst composite by treating the alumina, or chromia-alumina as the case may be, with an alkali metal hydroxide or an alkali metal salt such as lithium hydroxide, lithium nitrate, potassium hydroxide, potassium nitrate, sodium hydroxide, sodium nitrate, etc., in aqueous solution and thereafter calcining the resultant composite at from about 500 to about 700° C. whereby said hydroxide or salt is thoroughly decomposed.

The desired catalyst composite may then be obtained by treating the chromia-alumina-alkali metal composite with, for example, a rhodium salt such as rhodium chloride, rhodium nitrate, etc., in aqueous solution in an amount sufficient to yield a finished catalyst composite containing from about 0.05 to about 2.5 weight percent rhodium, and preferably from about 0.3 to about 1.5 weight percent. The rhodium component of the catalyst appears to have a unique effect on the dealkylation reaction herein contemplated. For example, other noble metals, excepting platinum and palladium, are substantially ineffective as a component of the catalyst of this invention. While platinum and palladium do impart the desired activity and selectivity to the catalyst composite at substantially (about 100° C.) higher temperatures than does rhodium, the resulting operation is substantially unstable and not conducive to extended periods of operation as required of commercial processes. Rhodium on the other hand gives the desired stability to the catalyst and, in association with the chromia component, gives a higher degree of selectivity. It has been observed that rhodium and chromia exhibit a peculiar relationship with respect to the dealkylation reaction herein contemplated. For example, the rhodium content of the catalyst composition can be minimized by increasing the chromia content to a relatively high level, say about 40 weight percent, and yet maintain a substantially high conversion, selectivity and stability level. This is so in spite of the fact that chromia alone has proved to be substantially inoperative. When the chromia concentration is established at a low level, say about 10 weight percent, the conversion, selectivity and stability characteristics of the catalyst composition are relatively poor and improvement in activity by increasing the rhodium content of the catalyst composition is accompanied by significant loss of selectivity. In any given case conversion, selectivity and stability can be maximized by adjusting the chromia and rhodium concentrations within the stated limitations.

The dealkylation reaction of this invention is effected by commingling water with the alkyl aromatic hydrocarbon charge stock in a molar ratio of from about 2/1 to about 30/1 and heating the mixture in contact with the aforesaid catalyst at a temperature of from about 400 to about 600° C. The dealkylation reaction is suitably effected at a pressure of from about atmospheric to about 750 pounds per square inch gauge (p.s.i.g.), a pressure of from about 75 p.s.i.g. to about 400 p.s.i.g. being preferable.

The process is particularly adapted to the dealkylation of alkylbenzenes such as toluene, the xylenes, the trimethylbenzenes, ethylbenzene, cumene, and the like. Alkylbenzenes containing larger alkyl substituents can also be dealkylated as well as alkyl aromatic hydrocarbons comprising a condensed benzene nucleus such as the alkylnaphthalenes, the alkylphenanthrenes, the alkylanthracenes, etc., as well as mixtures thereof. It will be appreciated that by varying reaction conditions within the limitations set forth, the alkyl aromatic hydrocarbon may be either partially or completely dealkylated. For example, mesitylene can be selectively converted to m-xylene.

The process of this invention may be effected in either a batch or a continuous type of operation. In the preferred continuous type of operation, the water is preferably converted to steam and commingled with the alkyl aromatic hydrocarbon charge in the stated ratio. The mixture may then be preheated and charged to a reactor containing the catalyst disposed in a fixed bed therein. The hydrocarbon is suitably charged to the reactor at a liquid hourly space velocity of from about 0.1 to about 20, a liquid hourly space velocity of from about 0.5 to about 5 being preferred. The term liquid hourly space velocity as herein employed is defined as the unit volume of liquid hydrocarbon charged per hour per unit volume of catalyst contained in the reaction zone. The products of the alkylation reaction are conveniently recovered by passing the hot reactor effluent to a condenser-separator whereby the normally liquid components are condensed to form an upper hydrocarbon layer and a lower aqueous layer, the noncondensable products, such as hydrogen, carbon monoxide, carbon dioxide, methane, ethane, etc., being discharged overhead. The hydrocarbon layer is continuously separated from the aqueous layer and dried and fractionated to recover the desired product, any unconverted alkyl aromatic hydrocarbons being recycled to the reactor as a portion of the hydrocarbon charge thereto. Hydrogen is a principal byproduct of the process of this invention and comprises a substantial portion of the noncondensable product. Recycle of the hydrogen permits a higher conversion of the alkyl aromatic hydrocarbon in the upper temperature range. However, conversion to the desired aromatic products, or selectivity, is adversely affected as is catalyst stability.

The following examples are presented in illustration of the present invention and are not intended as an undue limitation on the generally broad scope of the invention as set out in the appended claims.

Example I

A catalyst composite containing about 0.4% rhodium, 40% chromia, 2% potassium oxide, and the remainder alumina, was prepared in the following manner: The alumina component was prepared by dissolving about 1000 grams of aluminum chloride hexahydrate in 10 liters of water and adjusting the pH to 9.0–8.5 by the addition of 70 cubic centimeters of concentrated ammonium hydroxide. The precipitate was recovered by filtration and washed three times with about 25 cubic centimeters of concentrated ammonia in 12 liters of water. The washed material was then slurried with a common solution of 383 grams of chromium trioxide and 15.7 grams of potassium nitrate in 1.2 liters of water. The slurry was evaporated to dryness, further dried at 250° C., and calcined at 650° C. 132 grams of particles in the 20–40 mesh range were separated and impregnated with an aqueous solution consisting of 1.33 grams of rhodium chloride in 112 cubic centimeters of water. The resulting composite was dried and calcined at 550° C. for 4 hours.

About 52.55 grams of the catalyst, amounting to about 50 cubic centimeters was placed in a fixed bed of a vertical tubular reactor. Steam was charged to the reactor together with toluene charged thereto at a liquid hourly space velocity (LHSV) of about 0.5, the pressure being maintained at approximately 125 p.s.i.g. The reactor charge was passed downwardly through the catalyst bed and the reactor effluent collector in a condenser. The reactor temperature was adjusted periodically to maintain a substantially constant conversion level. The total conversion of the hydrocarbon charge, the selectivity of the catalyst in effecting demethylation of the toluene to the desired benzene product, and the reactor temperature required to maintain a substantially constant conversion, are tabulated below together with other pertinent data in Table I.

TABLE I

| On stream (hrs.) | $H_2O/C_7H_8$ (mole ratio) | Temp. (° C.) | Total conversion (mole percent) | Selectivity, percent | $C_6H_6$ in prod. (wt. percent) |
|---|---|---|---|---|---|
| 13 | 17.5 | 430 | 67.9 | 94.9 | 60.5 |
| 29 | 19.5 | 434 | 69.3 | 94.8 | 62.0 |
| 45 | 19.0 | | 66.1 | 95.2 | 58.6 |
| 61 | 19.2 | | 64.8 | 95.2 | 57.3 |
| 77 | 20.5 | | 63.5 | 94.5 | 55.8 |
| 96 | 19.6 | 441 | 68.3 | 94.2 | 60.6 |
| 112 | 18.4 | 444 | 67.0 | 94.1 | 59.3 |
| 128 | 21.5 | 446 | 70.3 | 93.1 | 62.5 |
| 144 | 19.8 | 448 | 71.4 | 93.7 | 63.8 |

The stability of the catalyst is indicated by the relatively small change in temperature (about 3°/day,) required to maintain a substantially constant conversion of 64–71 mole percent, with selectivity being in excess of about 93% throughout the run.

Example II

This example is presented to illustrate the influence of temperature in the dealkylation of p-xylene to yield a partial dealkylation product. A catalyst composite containing 0.8% rhodium, 10% chromia, 0.1% potassium oxide and the remainder alumina, was prepared as follows: The alumina was prepared in spherical form in the above described manner and steam treated with a mixture comprising 60 mole percent water admixed with nitrogen for 12 hours at about 600° C. The steam treated alumina was then impregnated with a common solution of chromium nitrate and potassium nitrate, dried and calcined, and further impregnated with rhodium chloride, dried and calcined.

About 7.5 grams of the catalyst, amounting to about 25.0 cubic centimeters was placed in a fixed bed of a vertical tubular reactor. Steam was charged to the reactor in about a 20/1 mole ratio with p-xylene charged thereto at a LHSV of about 1, the pressure being maintained at approximately 250 p.s.i.g. The product distribution at various temperature levels is tabulated below.

PRODUCT ANALYSIS

| Temp., ° C. | Benzene | Toluene | p-Xylene |
|---|---|---|---|
| 380 | 1.0 | 11.1 | 87.9 |
| 400 | 2.8 | 19.4 | 77.8 |
| 420 | 1.9 | 24.1 | 74.0 |
| 440 | 8.9 | 22.0 | 69.1 |

I claim as my invention:

1. A catalyst composition comprising alumina having from about 0.1 to about 4 weight percent alkali metal, from about 0.05 to about 2.5 weight percent rhodium and from about 1.0 to about 60 weight percent chromia composited therewith.

2. The catalyst composition of claim 1 further characterized in that said rhodium comprises from about 0.05 to about 0.75 weight percent of the catalyst composite.

3. The catalyst composition of claim 2 further characterized in that said alkali metal is potassium.

4. A process for the dealkylation of an alkyl aromatic hydrocarbon which comprises commingling water with said hydrocarbon in a molar ratio in from about 2/1 to about 30/1 and heating the mixture at a temperature of from about 400 to about 600° C. in contact with a catalyst composition comprising alumina having from about 0.1 to about 4 weight percent alkali metal, from about 0.05 to about 2.5 weight percent rhodium and from about 1.0 to about 60 weight percent chromia composited therewith.

5. The process of claim 4 further characterized in that said rhodium comprises from about 0.3 to about 1.5 weight percent of said catalyst composition.

6. The process of claim 5 further characterized in that said alkali metal is potassium.

7. The process of claim 6 further characterized in that said alkyl aromatic hydrocarbon is an alkyl benzene.

8. The process of claim 5 further characterized in that alkyl benzene is toluene.

References Cited

UNITED STATES PATENTS 3,222,132    12/1965    Dowden _____ 23—212
3,306,944    2/1967    Pollitzer _____ 260—672

DELBERT E. GANTZ, *Primary Examiner.*

G. E. SCHMITKONS, *Assistant Examiner.*

U.S. Cl. X.R.

252—465, 470